(12) United States Patent
Blochmann et al.

(10) Patent No.: US 8,105,071 B2
(45) Date of Patent: Jan. 31, 2012

(54) MOULD HOUSING

(75) Inventors: Erik Blochmann, Neutraubling (DE); Gerald Huettner, Vilseck (DE); Florian Schmid, Ihrlerstein (DE)

(73) Assignee: Krones AG (DE)

( * ) Notice: Subject to any disclaimer, the term of this patent is extended or adjusted under 35 U.S.C. 154(b) by 367 days.

(21) Appl. No.: 12/363,113

(22) Filed: Jan. 30, 2009

(65) Prior Publication Data
US 2009/0232929 A1 Sep. 17, 2009

(30) Foreign Application Priority Data

Feb. 4, 2008 (DE) .......................... 10 2008 007 631

(51) Int. Cl.
*B29C 49/48* (2006.01)
(52) U.S. Cl. ......... 425/522; 249/102; 249/111; 425/526
(58) Field of Classification Search .................. 425/182, 425/195, 522, 526; 249/102, 111
See application file for complete search history.

(56) References Cited

U.S. PATENT DOCUMENTS

| | | | | |
|---|---|---|---|---|
| 705,772 | A | * | 7/1902 | Messer ........................ 425/526 |
| 791,240 | A | * | 5/1905 | Boucher ...................... 65/236 |
| 3,056,166 | A | * | 10/1962 | Weinberg ..................... 249/102 |
| 5,176,839 | A | * | 1/1993 | Kim ............................... 249/78 |
| 5,766,299 | A | * | 6/1998 | Miller ........................... 65/261 |
| 5,993,721 | A | | 11/1999 | Kurihara et al. .............. 264/402 |
| 6,447,281 | B1 | | 9/2002 | Petre ............................ 425/195 |
| 6,913,455 | B2 | * | 7/2005 | Tsau et al. .................... 425/522 |
| 6,948,924 | B2 | * | 9/2005 | Tsau et al. .................... 425/195 |
| 2004/0202745 | A1 | | 10/2004 | Tsau et al. .................... 425/522 |
| 2005/0006380 | A1 | * | 1/2005 | Kagan ......................... 219/661 |
| 2006/0219709 | A1 | * | 10/2006 | Kagan ......................... 219/661 |
| 2010/0203186 | A1 | * | 8/2010 | Tsau et al. .................... 425/526 |

FOREIGN PATENT DOCUMENTS

| | | |
|---|---|---|
| JP | 57-20328 | 2/1982 |
| JP | 8-174552 | 7/1996 |
| WO | WO 2005/123357 | 12/2005 |

OTHER PUBLICATIONS

EPO Search Report, dated, Jun. 10, 2009, (6 pgs).

* cited by examiner

*Primary Examiner* — Robert B Davis
(74) *Attorney, Agent, or Firm* — Hayes Soloway P.C.

(57) ABSTRACT

A mould housing for apparatuses for expanding plastic containers has at least two mould parts which can be assembled together and which in an assembled state have an interior space for accommodating the plastic container that is to be expanded. The housing has at least one insulating element which can be placed against an outer wall of at least one mould part. The insulating element has a curved profile, wherein the curvature of the insulating element is matched to a curvature of the outer wall.

21 Claims, 3 Drawing Sheets

MOULD HOUSING

The present invention relates to a mould housing for apparatuses for expanding plastic containers. It is known from the prior art to expand plastic preforms to form plastic containers. These preforms are placed in a blow mould and are expanded using predefined pressure parameters, for example using compressed air, to form the container. This blow mould is usually arranged in a mould housing which can be opened. This mould housing is on the one hand usually suitable for accommodating different blow moulds and on the other hand provides suitable temperatures or suitable ambient conditions for the actual blow mould. Outside the mould housing, which is also referred to below as the mother mould, usually an additional mould carrier is provided. In this case, it is desirable to thermally insulate this mould housing at least partially relative to the mould carrier. It is known from the prior art to place insulating strips between the mould carrier and the mould housing for thermal insulation purposes. These insulating strips work in a satisfactory manner, but in the case of unfavorable parameters may lead to stresses on the mould housing or also on the mould carrier and in the extreme case may even lead to fractures.

The object of the present invention is therefore to provide a mould housing which on the one hand is uniformly insulated but on the other hand also provides a uniform force distribution.

A mould housing according to the invention for apparatuses for expanding plastic containers comprises at least two mould parts which can be assembled together and which in an assembled state have an interior space for accommodating the plastic container that is to be expanded. Also provided is at least one insulating element which can be placed against an outer wall of at least one mould part. According to the invention, the insulating element has a curved profile, wherein the curvature of the insulating element is matched to a curvature of the outer wall.

In particular, a blow mould may be accommodated in an interior space of the assembled mould parts, within which blow mould the preform can in turn be expanded in order to form a plastic container. The insulating element is preferably a sheet-like element. By matching the curvature of the insulating element to the curvature of the outer wall, the situation is achieved whereby the insulating element, which is preferably an insulating shell, can be placed directly or indirectly against the outer wall. This means that the insulating element can on the one hand be placed directly against the outer wall of the mould parts, but it is also conceivable and preferable to accommodate underlay elements between the insulating element and the outer wall of the mould parts.

In a further preferred embodiment, the insulating element is curved by a circumferential angle which is greater than 30°, preferably greater than 60°, preferably greater than 90°, particularly preferably greater than 120° and particularly preferably greater than 150°. It is thus possible to place the insulating element against the outer wall around a suitably large circumferential angle. In this case, it is possible that a radius of curvature of the insulating element is slightly greater than a corresponding radius of curvature of the outer wall of the mould parts, in order in this way to facilitate the placement of the insulating element.

In a further preferred embodiment, the insulating element essentially completely surrounds the mould part or the outer wall thereof in the circumferential direction. By virtue of this procedure, it is possible to distribute over a relatively large surface area the forces acting on the insulating shell, for example the forces acting from outside. In this way, stresses or even fractures of the mould parts can be avoided.

In a further advantageous embodiment, the insulating element covers a predefined portion of the outer wall of the mould part, wherein this portion is greater than 50%, greater than 70%, preferably greater than 80% and particularly preferably greater than 90%. Most of the mould part and of the entire mould housing as a whole is thus covered by the insulating element, wherein a very uniform force distribution across the insulating element is possible as a result of this procedure, as mentioned above. A very uniform insulating effect can also be achieved in this way.

In a further advantageous embodiment, the insulating element is made from a plastic or comprises a plastic. Preferably, a glass-fiber-reinforced composite material is used as the material for the insulating element. It is also conceivable to produce the insulating element from other materials, such as e.g. from ceramic.

In a further advantageous embodiment, the insulating element has at least one viewing opening. These may be openings of small cross section, through which it is possible to ascertain whether further spacers are provided below the insulating element.

In a further advantageous embodiment, at least one underlay element is arranged between the insulating element and the mould part. In this way, it is possible to adapt to different diameters of the mould parts or to achieve an adaptation to different processes. A liquid preferably flows around and through the mould parts, which ensures a uniform temperature control of these mould parts. Depending on the temperatures of this liquid, the mould parts can expand to varying degrees. By using said underlay elements, it is possible to compensate these different expansions. Preferably, the underlay elements are made from metal, and in particular from sheet metal.

Preferably, the underlay element is also a curved element, wherein the curvature of the underlay element is matched to a curvature of the mould part. The underlay element thus preferably has a shape similar to that of the insulating element and can be placed essentially completely against the latter. Preferably, the insulating element is a sheet-like element and has a uniform thickness. The underlay element also advantageously surrounds the mould part essentially completely.

In a further advantageous embodiment, the underlay element has at least one viewing opening. By means of this viewing opening of the underlay element, it is once again possible to see elements which are present below this underlay element, such as in particular, but not exclusively, a further underlay element.

Preferably, the underlay element has an inscription which is characteristic of a thickness of the underlay element. For example, information regarding a thickness of the underlay element in mm may be applied to the underlay element. Preferably, the inscription of the underlay element lies below a viewing opening of the insulating element in an assembled state. This means that the abovementioned viewing opening of the insulating element can be used to determine, through the insulating element, the thickness of an underlay element located therebelow. It would also be possible to use a plurality of underlay elements, in particular also underlay elements of different thicknesses, in order in this way to achieve a higher degree of variability for different expansion coefficients of the mould parts.

The present invention also relates to an apparatus for expanding plastic containers, wherein this apparatus comprises a mould housing of the type described above and a holder which can be fitted around this mould housing. Preferably, this holder is a mould carrier which essentially completely surrounds the mould housing. In this embodiment, the insulating element is thus arranged between the mould carrier and the mould housing. Preferably, as mentioned above, this is a two-part mould housing which is composed of two mould parts which can be assembled together. Accordingly, two insulating elements are also provided, which are placed around the two mould parts.

In one advantageous embodiment, the apparatus comprises a blow mould which can be fixed inside the mould housing.

Further advantages and embodiments will emerge from the appended drawings:

Figure 1:
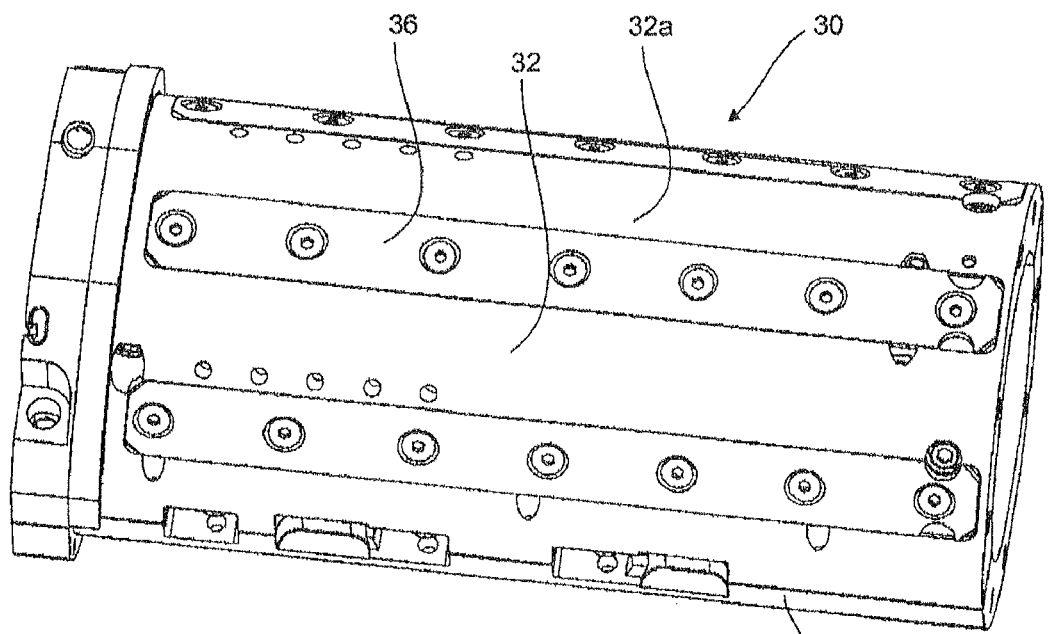
FIG. 1 shows a mould housing according to the prior art.

FIG. 1 shows a mould housing 30 according to the prior art. This mould housing 30 comprises two mould parts 32, wherein the lower mould part 32 in FIG. 1 is essentially hidden by the upper mould part. A blow mould for the blow-moulding of the containers can be arranged in the interior of this mould part, as mentioned above. Reference 36 denotes insulating strips which are arranged on the outer wall 32a of the mould part. In this case, recesses are provided, into which the insulating strips 36 are placed and then screwed. It is thus possible for stresses to occur in the mould parts 32 in the event of expansions or even different expansion coefficients of the insulating strips 36, and in the extreme case this may even lead to fractures of the mould parts 32.

Figure 2:
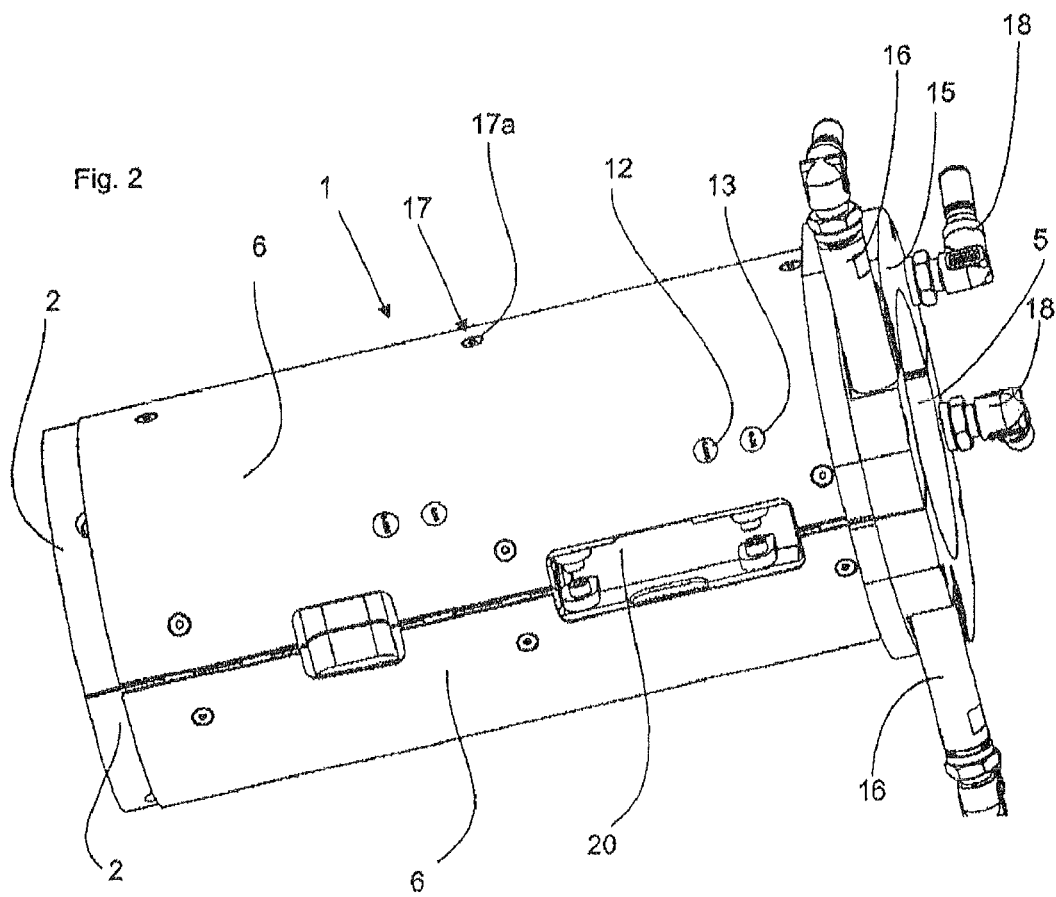
FIG. 2 shows a mould housing according to the invention.

FIG. 2 shows a mould housing 1 according to the invention. This mould housing 1 also comprises two mould parts 2 which can be placed against one another. In the assembled state, an interior space 5 is likewise formed between these mould parts 2, within which a blow mould can be provided which contains the container that is to be blow-moulded. The two mould parts 2 in each case have recesses 20 in their outer walls 15, which recesses serve for opening the mould housing 1.

During the individual blow-moulding process, the two mould parts and thus the mould housing can therefore be opened, in order thus to gain access to the blow mould located inside with the container. The blow mould itself is also opened in this way. Here, insulating elements 6 are arranged around the two mould parts 2. More specifically, a shell made from a glass-fiber-reinforced composite material is used here as the insulating element. Underlay elements, such as underlay sheets, may preferably be located below this insulating element, although these are hidden here. By means of these underlay elements, it is possible to adjust the outer diameter of the mould housing or mother mould.

It would also be possible to produce the insulating element from a special insulating material or from a glass-fiber-reinforced composite material. While in the embodiment shown in FIG. 1 the mould housing bears against the mould carrier only via the insulating strips 36, in the embodiment according to the invention a flat contact takes place across the entire insulating element 6. References 16 and 18 denote feed and discharge lines, respectively, for introducing liquid into the interior of the outer wall 15 of the mould parts 2 in order to heat these mould parts. Hoses can be connected to these connections 16 and 18 in order to feed the respective liquid to the mould parts. The hoses and also the connections thus serve for the temperature control of the mould housing. It can be seen that the curvature of the outer wall 15 of the mould parts 2 is matched to the curvature of the insulating element 6.

References 12 and 13 denote viewing openings in the insulating element 6 in order to be able to see inscriptions on underlay elements arranged therebelow. Reference 17 denotes screw connections for arranging the insulating element 6 on the mould parts 2. It can be seen that, compared to the embodiment shown in FIG. 1, a much smaller number of such screw connections are required. The heads 17a of these screw connections are sunk here relative to the surface of the insulating element 6, so that towards the outside a contact takes place only via the insulating element 6, but not via the heads 17a of the screw connections 17. Overall, it is possible to fix the insulating element 6 by means of a small number of screws, here for example by means of just 9 screws.

Figure 3:
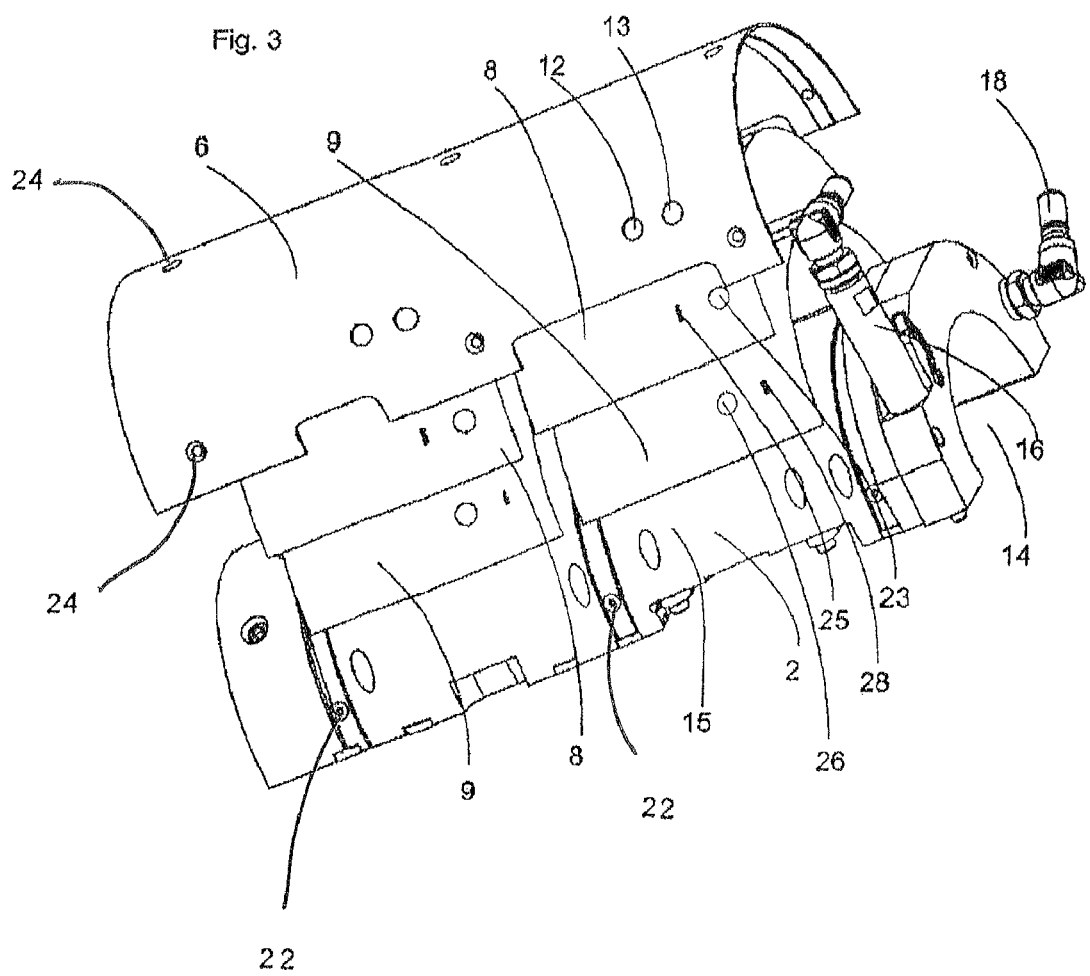
FIG. 3 shows an exploded view of a mould housing according to the invention.

FIG. 3 shows an exploded view of the mould housing 1 shown in FIG. 2. It can be seen that it is possible to provide two underlay elements 8 and 9 below the insulating element 6. If desired, these underlay elements have different thicknesses. If, for example, a thickness of 0.025 mm is used as the thickness of the upper underlay element 8 and a thickness of 0.05 is used for the lower underlay element 9, then by suitably combining these underlay elements it is possible to set diameter ranges of 0.15 mm, depending on whether use is made of only the underlay element 9, only the underlay element 8 or both underlay elements or no underlay elements.

This adjustment range is in any case sufficient for compensating the different expansions brought about by different temperatures inside the mould part. Preferably, the underlay elements 9 and 8 are designed in two parts, and therefore two underlay elements 8 and two underlay elements 9 are shown in FIG. 2. A correspondingly assembled housing would in this case have a total of four underlay elements 8 and four underlay elements 9. In this case, the individual underlay elements 8, 9 are in each case of identical design.

It would in principle be possible to screw the underlay elements also together with the insulating element 6, but in order to avoid stresses the screwing of the insulating element takes place only directly via suitable holes 22 on the mould parts. Here, the underlay elements are not screwed either to the mould parts 2 or to the insulating element 6.

It can be seen that the openings 24 in the insulating element have inwardly pointing bevels in order, as mentioned above, to sink the head 17a of the screw elements 17 therein. It can be seen that the upper underlay element 8 has an opening 23 and an inscription 25. The underlay element 9 has an opening 26 and an inscription 28. Here, the opening 23 of the underlay element 8 is arranged in such a way that it is located below the opening 13 of the insulating element 6 in the assembled state.

The inscription 25 is arranged in such a way that it is located below the opening 12 of the insulating element 6 in the assembled state. Correspondingly, the inscription 28 of the underlay element 9 is arranged in such a way that it is located below the two openings 23 and 13. The opening 26 is likewise arranged in such a way that it is located below the opening 12 of the insulating element 6 in the assembled state.

Figure 4:
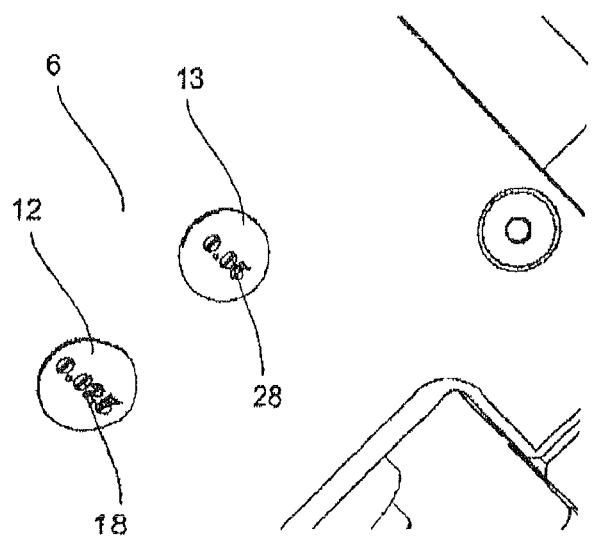
FIG. 4 shows a detail view of the mould housing of FIG. 2.

FIG. 4 shows an enlarged view of the embodiment shown in FIG. 2. It can be seen here that the two inscriptions 25 and 28 can be seen through the two openings 12 and 13. In this case, the inscription 25 of the underlay element 8 can be seen directly through the opening 12, whereas the inscription 28 of the mould element 19 on the other hand can be seen through the opening 13 and the opening 23 of the underlay element 8. In this way, the situation can be achieved whereby it is always possible, regardless of the arrangement of the two mould elements 8 and 9, to see through the openings 12 and 13 in order to ascertain whether and, if so, which underlay elements are arranged below the insulating element 6. This results not only in an adjustment possibility for the outer diameter of the insulating element, but also in a convenient reading possibility for the user and thus information as to which underlay elements are being used.

Figure 5:
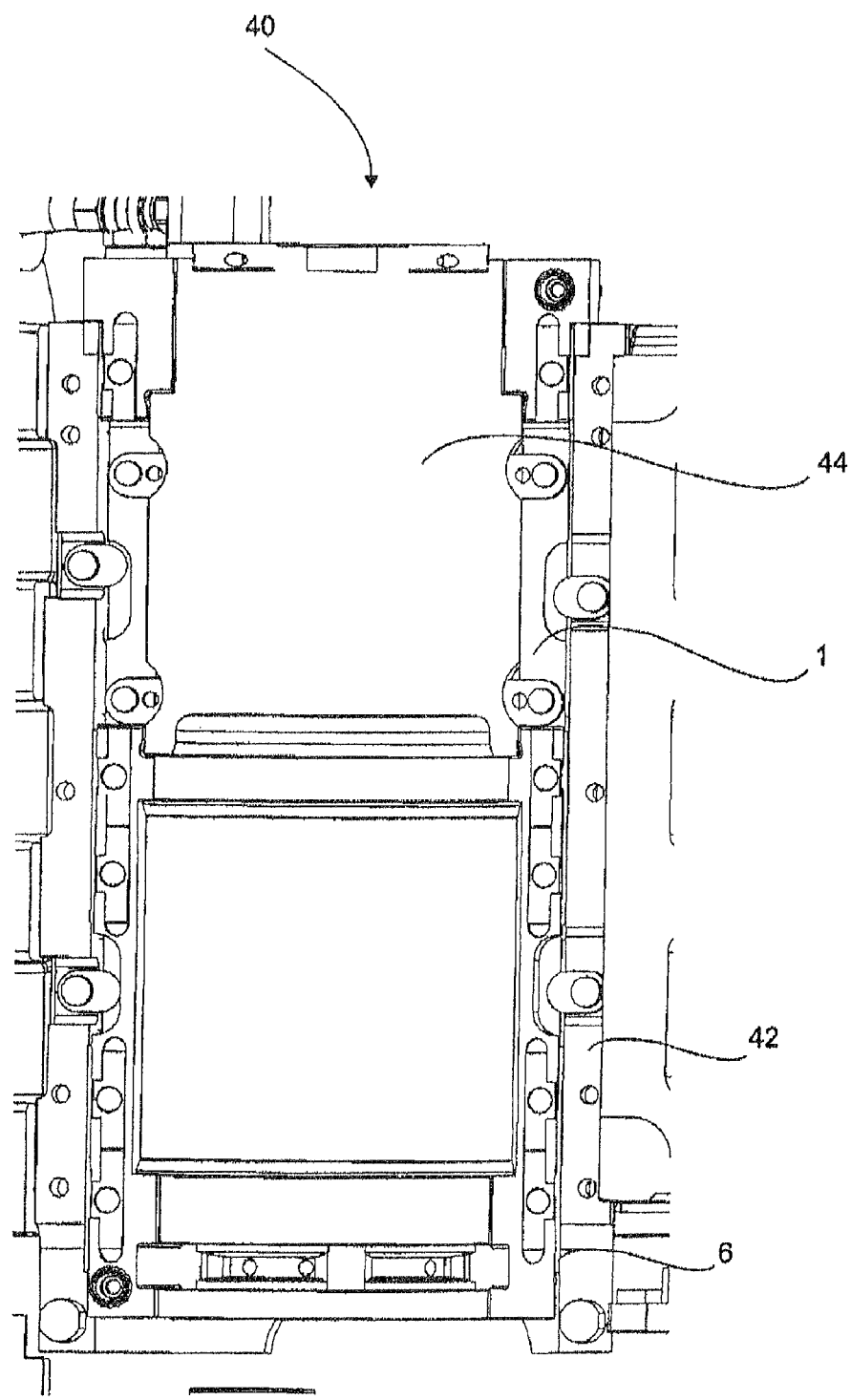
FIG. 5 shows an apparatus for expanding plastic containers.

FIG. 5 shows an apparatus 40 for expanding plastic containers. This apparatus 40 comprises a holder or a mould carrier 42, inside which the mould housing 1 is securely arranged. A blow mould 44 is in turn securely arranged inside the mould housing 1. The individual contours of this blow mould, which are transferred onto the container that is to be produced, are not shown in FIG. 5. An insulating element 6 in the form of the insulating shell according to the invention can be seen between the mould housing 1 and the mould carrier 42.

All of the features disclosed in the application documents are claimed as essential to the invention in so far as they are novel individually or in combination with respect to the prior art.

The invention claimed is:

1. A mould housing for apparatuses for expanding plastic containers, comprising at least two mould parts which can be assembled together and which in an assembled state have an interior space for accommodating the plastic container that is to be expanded, and comprising at least one thermally insulating element which can be placed against an outer wall of at least one mould part, wherein the insulating element has a curved profile, wherein the curvature of the insulating element is matched to a curvature of the outer wall.

2. The mould housing according to claim 1, wherein the insulating element is curved by an angle which is greater than 30°.

3. The mould housing according to claim 1, wherein the insulating element is curved by an angle which is greater than 60°.

4. The mould housing according to claim 1, wherein the insulating element is curved by an angle which is greater than 90°.

5. The mould housing according to claim 1, wherein the insulating element is curved by an angle which is greater than 120°.

6. The mould housing according to claim 1, wherein the insulating element is curved by an angle which is greater than 150°.

7. The mould housing according to claim 1, wherein the insulating element essentially completely surrounds the mould part in a circumferential direction.

8. The mould housing according to claim 1, wherein the insulating element covers a predefined portion of the outer wall of the mould part, wherein this portion is greater than 50%.

9. The mould housing according to claim 1, wherein the insulating element covers a predefined portion of the outer wall of the mould part, wherein this portion is greater than 70%.

10. The mould housing according to claim 1, wherein the insulating element covers a predefined portion of the outer wall of the mould part, wherein this portion is greater than 80%.

11. The mould housing according to claim 1, wherein the insulating element covers a predefined portion of the outer wall of the mould part, wherein this portion is greater than 90%.

12. The mould housing according to claim 1, wherein the insulating element is made from a plastic.

13. A mould housing for apparatuses for expanding plastic containers, comprising at least two mould parts which can be assembled together and which in an assembled state have an interior space for accommodating the plastic container that is to be expanded, and comprising at least one insulating element which can be laced against an outer wall of at least one mould part, wherein the insulating element has a curved profile, and at least one viewing opening, wherein the curvature of the insulating element is matched to a curvature of the outer wall.

14. The mould housing according to claim 1, wherein at least one underlay element is arranged between the insulating element and the mould part.

15. The mould housing according to claim 14, wherein the underlay element is a curved element, wherein the curvature of the underlay element is matched to a curvature of the mould part.

16. The mould housing according to claim 14, wherein the underlay element has at least one viewing opening.

17. The mould housing according to claim 16, wherein the viewing opening of the underlay element lies below a viewing opening of the insulating element in an assembled state.

18. The mould housing according to claim 14, wherein the underlay element has an inscription which is characteristic of a thickness of the underlay element.

19. The mould housing according to claim 18, wherein the inscription of the underlay element lies below a viewing opening of the insulating element in an assembled state.

20. An apparatus for expanding plastic containers, comprising a mould housing according to claim 1 and a holder which can be fitted around mould housing.

21. The apparatus according to claim 20, wherein the apparatus comprises a blow mould which can be fixed inside the mould housing.

* * * * *

UNITED STATES PATENT AND TRADEMARK OFFICE
CERTIFICATE OF CORRECTION

PATENT NO. : 8,105,071 B2
APPLICATION NO. : 12/363113
DATED : January 31, 2012
INVENTOR(S) : Blochmann et al.

It is certified that error appears in the above-identified patent and that said Letters Patent is hereby corrected as shown below:

Claim 13, Col. 6, line 20 "be laced against" should be --be placed against--.

Signed and Sealed this
Twelfth Day of March, 2013

Teresa Stanek Rea
*Acting Director of the United States Patent and Trademark Office*